US012039839B2

(12) United States Patent
Clemenson et al.

(10) Patent No.: US 12,039,839 B2
(45) Date of Patent: Jul. 16, 2024

(54) SYSTEM AND METHOD FOR PURCHASING LOTTERY TICKETS

(71) Applicant: AMERICORP INVESTMENTS LLC, Denver, CO (US)

(72) Inventors: Matthew Clemenson, San Francisco, CA (US); Lawrence Anthony DiMatteo, Pittsburgh, CA (US)

(73) Assignee: Americorp Investments LLC, Denver, CO (US)

( * ) Notice: Subject to any disclaimer, the term of this patent is extended or adjusted under 35 U.S.C. 154(b) by 271 days.

(21) Appl. No.: 17/117,848

(22) Filed: Dec. 10, 2020

(65) Prior Publication Data

US 2021/0097800 A1 Apr. 1, 2021

Related U.S. Application Data

(62) Division of application No. 15/493,094, filed on Apr. 20, 2017, now Pat. No. 11,694,520.

(60) Provisional application No. 62/399,335, filed on Sep. 23, 2016, provisional application No. 62/326,686, filed on Apr. 22, 2016.

(51) Int. Cl.
*G07F 17/32* (2006.01)
*G07F 17/42* (2006.01)

(52) U.S. Cl.
CPC ........ *G07F 17/329* (2013.01); *G07F 17/3223* (2013.01); *G07F 17/3251* (2013.01); *G07F 17/42* (2013.01)

(58) Field of Classification Search
CPC ...................................................... G07F 17/329
See application file for complete search history.

(56) References Cited

U.S. PATENT DOCUMENTS

| | | | | |
|---|---|---|---|---|
| 6,929,544 | B2 | 8/2005 | Osterer | |
| 2002/0098829 | A1 * | 7/2002 | Tendler | G07F 17/3237 455/410 |
| 2003/0023547 | A1 | 1/2003 | France et al. | |
| 2004/0204232 | A1 | 10/2004 | Asher | |
| 2007/0060285 | A1 | 3/2007 | White et al. | |
| 2008/0015005 | A1 | 1/2008 | Yaldoo | |

(Continued)

FOREIGN PATENT DOCUMENTS

| | | | |
|---|---|---|---|
| KR | 2004-0062224 | A | 7/2004 |
| WO | 2017184913 | A1 | 10/2017 |

OTHER PUBLICATIONS

Wright, Aaron et al., Abstract for "Decentralized Blockchain Technology And The Rise Of Lex Cryptographia," 3 pages, Mar. 10, 2015.

(Continued)

*Primary Examiner* — James S. McClellan
*Assistant Examiner* — Jeffrey K Wong
(74) *Attorney, Agent, or Firm* — Ortiz & Lopez, PLLC; Luis M. Ortiz; Kermit D. Lopez

(57) ABSTRACT

A system and method for purchasing lottery tickets via a client computing device. A user may access a purchase module via a client computing device and select lottery tickets and lottery numbers to purchase from available lotteries in their state. The user may be notified of the results by the purchase module or a results module. Once notified, the user may withdraw their winnings or use the winnings to purchase lottery tickets future drawings.

13 Claims, 12 Drawing Sheets

(56) References Cited

U.S. PATENT DOCUMENTS

| | | | | |
|---|---|---|---|---|
| 2008/0167079 | A1* | 7/2008 | Garrettson | G06Q 30/02 455/566 |
| 2010/0019453 | A1* | 1/2010 | Oakes | G07F 17/3258 273/269 |
| 2010/0113124 | A1 | 5/2010 | Amirsadri | |
| 2013/0012286 | A1* | 1/2013 | Schuff | G06Q 20/0457 463/25 |
| 2013/0029744 | A1 | 1/2013 | Harding et al. | |
| 2013/0072280 | A1 | 3/2013 | Yacenda | |
| 2015/0050977 | A1* | 2/2015 | Omar | H04W 12/06 455/26.1 |
| 2015/0278820 | A1* | 10/2015 | Meadows | G10L 25/48 705/64 |
| 2015/0310424 | A1 | 10/2015 | Myers | |
| 2015/0317842 | A1 | 11/2015 | Evans | |
| 2016/0085955 | A1 | 3/2016 | Lerner | |
| 2016/0086453 | A1 | 3/2016 | Cage | |
| 2016/0189467 | A1* | 6/2016 | Onorato | G07F 17/329 463/17 |
| 2016/0321654 | A1 | 11/2016 | Lesavich | |
| 2017/0084116 | A1* | 3/2017 | Anderson | G07F 17/3225 |
| 2017/0206382 | A1 | 7/2017 | Rodriguez De Castro | |
| 2017/0309117 | A1 | 10/2017 | Clemenson et al. | |
| 2018/0089759 | A1 | 3/2018 | Stradling | |
| 2018/0158162 | A1 | 6/2018 | Ramasamy | |
| 2019/0213831 | A1 | 7/2019 | Cage | |
| 2019/0236716 | A1 | 8/2019 | Kasper | |
| 2019/0386834 | A1 | 12/2019 | Furukawa | |
| 2020/0311790 | A1 | 10/2020 | Karen | |
| 2021/0097800 | A1 | 4/2021 | Clemenson et al. | |

OTHER PUBLICATIONS

U.S. Appl. No. 15/493,094, Notice of References Cited, Mar. 15, 2021.

U.S. Appl. No. 15/493,094, Notice of References Cited, May 27, 2021.

U.S. Appl. No. 15/493,094, Notice of References Cited, Jun. 27, 2020.

U.S. Appl. No. 15/493,094, Notice of References Cited, Aug. 19, 2022.

U.S. Appl. No. 15/493,094, Notice of Allowance, Feb. 21, 2023.

U.S. Appl. No. 15/493,094, Information Disclosure Statement, Sep. 9, 2017.

Aaron Wright, "Decentralized Blockchain Technology and the Rise of Lex Cryptographia," Posted Mar. 20, 2015, https://papers.ssrn.com/sol3/papers.cfm?abstract_id=2580664 (YEar: 2015).

Canadian Patent Application No. 3,053,545, Examiner Requisition, Mar. 5, 2021.

Canadian Patent Application No. 3,053,545, Examiner Requisition, Dec. 9, 2021.

* cited by examiner

SYSTEM AND METHOD FOR PURCHASING LOTTERY TICKETS

CROSS-REFERENCE TO RELATED APPLICATIONS

This application is a divisional of U.S. patent application Ser. No. 15/493,094, filed Apr. 20, 2017, entitled SYSTEM AND METHOD FOR PURCHASING LOTTERY TICKETS, which claims priority to U.S. Provisional Patent Application No. 62/326,686, filed Apr. 22, 2016, entitled SYSTEM AND METHOD FOR PURCHASING LOTTERY TICKETS and U.S. Provisional Patent Application No. 62/399,335, filed Sep. 23, 2016, entitled TRUSTLESS AND/OR SEMITRUSTLESS WAGERING SYSTEM AND METHOD, the entire disclosures of each of which are incorporated by reference herein in their entireties for all purposes.

TECHNICAL FIELD

Aspects of the disclosure are related to systems and methods for purchasing lottery tickets using mobile devices.

TECHNICAL BACKGROUND

In the prior art, a person wishing to purchase a lottery ticket would have to find a designated lottery vendor nearby. This can present difficulties to those who are immobile, work long hours, or are otherwise unable to travel to such designated vendors. Further, certain vendors do not allow for the purchase of lottery tickets using payment methods other than cash. As credit cards are used more and more, people typically carry little to no cash on their person.

SUMMARY

One aspect of the disclosure provides a system for purchasing lottery tickets, comprising: a purchase module configured to receive a user request for a predetermined quantity of lottery tickets; and a results module configured to notify a user of results corresponding to the predetermined quantity of lottery tickets.

Another aspect of the disclosure provides a method for purchasing lottery tickets, comprising: accessing a purchase module via a client computer device; authenticating the client computer device with a server computer device; transmitting a location of the client computer device to the server computer device, the location including a state in which the client computer device is currently located; selecting a predetermined number of lottery tickets and corresponding lottery numbers; transmitting a request to the server computer device to purchase the selected lottery tickets.

Another aspect of the disclosure provides a method of purchasing lottery tickets, comprising: receiving a request from a client computer to purchase a preselected number of lottery tickets and corresponding lottery numbers; transmitting the request to a terminal; purchasing the preselected number of lottery tickets and corresponding lottery tickets; and printing the preselected number of lottery tickets and corresponding lottery numbers at the terminal.

BRIEF DESCRIPTION OF THE DRAWINGS

The invention description below refers to the accompanying drawings.

DETAILED DESCRIPTION

Figure 1:
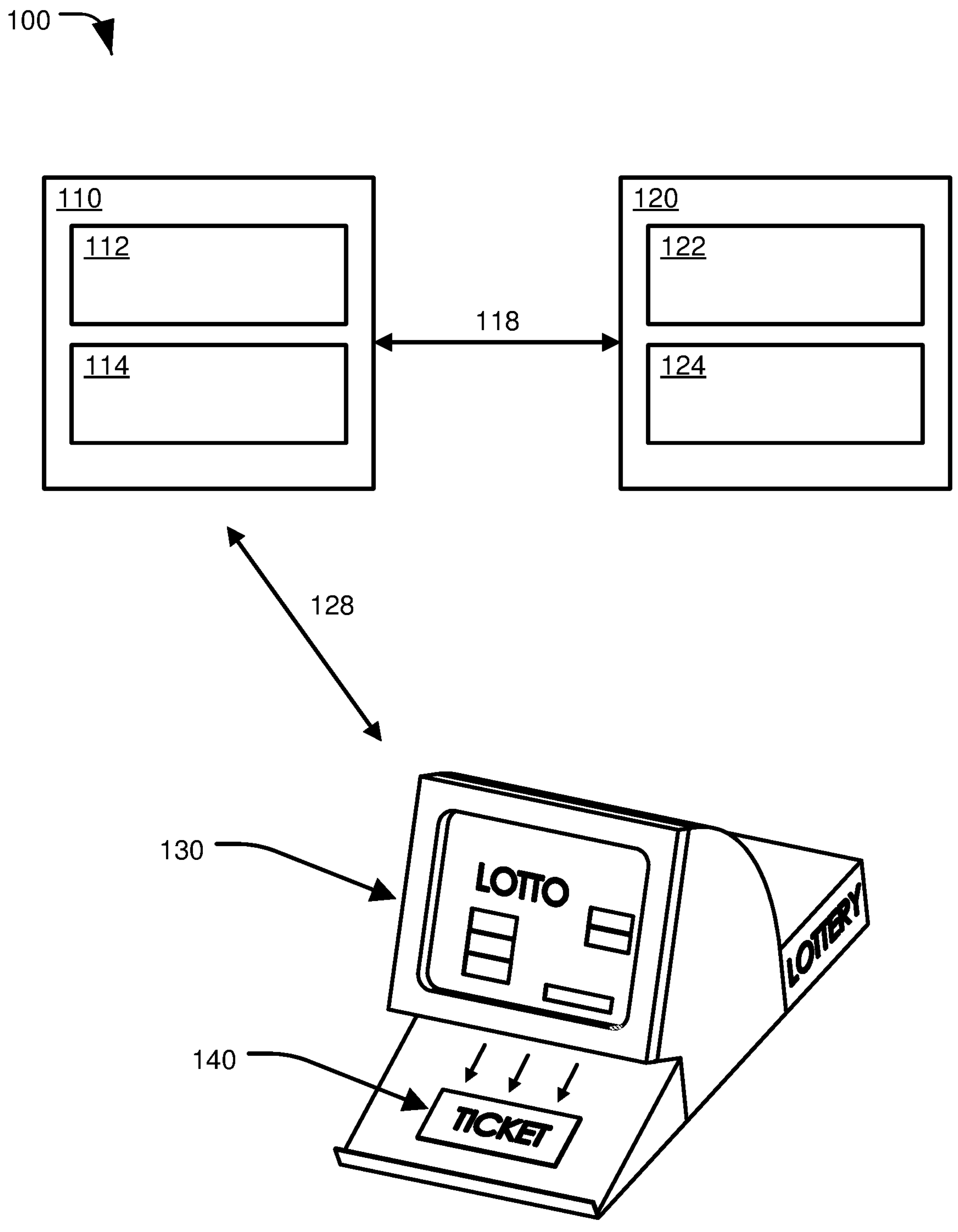
FIG. 1 depicts a hardware overview of a system according to one or more aspects of the disclosure.

FIG. 1 depicts a hardware overview of a system 100 according to one or more aspects of the disclosure. As shown, the system 100 can include a computer 110 having a processor 112 and a memory 114, and any other components typically present in a general purpose computer, such as a display, input (e.g., mouse, keyboard, touchscreen, etc.). The memory 114 may store information accessible by the processor 112, such as instructions that may be executed by the processor or data that may be retrieved, manipulated, or stored by the processor. Although FIG. 1 illustrates processor 112 and memory 114 as being within the same computer 110, it is understood that the processor 112 and memory 114 may respectively comprise one or more processors and/or memories that may or may not be stored in the same physical housing. In one example, the computer 110 may be one or more server computers in a server farm.

The computer 110 can communicate, directly or indirectly, wired or wirelessly via a link 118 to one or more electronic devices, such as a computer 120. The link can include the Internet, Wi-Fi, Ethernet, or any other type of wired or wireless communication links.

In one example, the computer 120 may be a client computer that may communicate with a server computer 110. The client computer 120 may be any type of computing device, such as a personal computer, tablet, mobile phone, PDA, etc. The client computer can have any kind of operating system, such as Windows®, Android®, iOS®, etc. The client computer can include a processor 122 and a memory 124 similar to the memory and processor described above, as well as any other components typically present in a general purpose computer, such as a display, camera, microphone, speakers, touch screen display, charging ports, data ports, etc. Although a single client computer 120 is depicted, the system can include a plurality of client devices connected to the server 110, in some cases simultaneously.

The system 100 can include a terminal 130. The terminal 130 can include a memory and a processor like the computers 110 and 120 above. In one example, the terminal 130 can be a lottery ticket terminal that can issue printed lottery tickets. In this regard, the terminal can include an onboard printer and paper supply or can be directly or indirectly connected to a printer to allow for physical printing of one or more paper lottery tickets 140. The terminal can also include a screen for displaying lottery ticket information, such as number of tickets and lottery numbers associated with the tickets. The terminal 130 can also include a scanning interface, such as a barcode reader or OCR, for reading printed lottery tickets and detecting the numbers, barcodes, or other machine readable codes printed thereon. The terminal 130 can communicate with the server computer via wired or wireless link 128, which can be similar to the link 118 described above. The terminal 130 can also communicate via a link (not shown) to a computer server operated by a state lottery server for communication therewith.

As used herein, a lottery can generally include, for example, any type of game of chance where numbers are drawn and winners are determined by the quantity of matched numbers to lottery tickets purchased prior to the drawings. As used herein, lottery ticket can generally include any type of printed ticket that includes one or more numbers printed thereon purchased for any state, national, or international lottery, such as three, four, five-number, or greater lottery drawings. This can include tickets for state lotteries or national lotteries, such as the well-known Powerball®.

The various methods and techniques described in the present application can be performed, executed, or carried out by one or more of the components 110-130 of the system 100, such as a software program stored at one or more of the memories described above and executed by one or more of the processors described. The software program to execute the various methods and techniques described below may be stored on a non-transitory computer readable medium, such as a CD-ROM, memory, hard-disk, etc.

Figure 2:
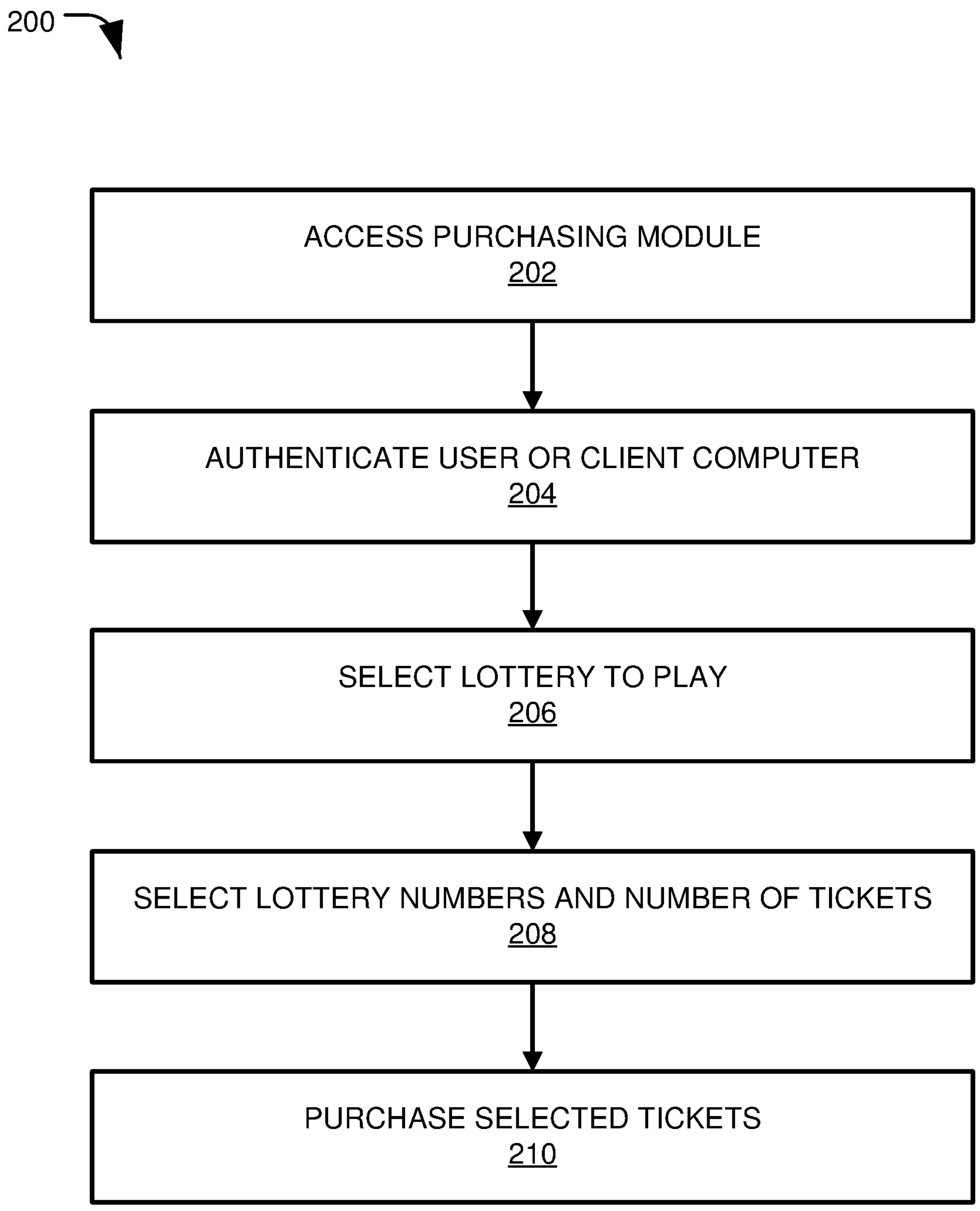
FIG. 2 is a method of purchasing a lottery ticket according to one or more aspects of the disclosure.

FIG. 2 is a method 200 of purchasing a lottery ticket according to one or more aspects of the disclosure.

At block 202, a user may use the client computer 120 to access or execute a purchasing module (or purchase module). The purchasing module can be a software application downloaded to the client device 120, stored at the memory 124, and executed by the processor 122 or can be an Internet website accessible via the Internet through a web browser on the client device 120. The purchasing module can be displayed on the screen of the client computer via a graphic user interface (GUI).

Figure 10:
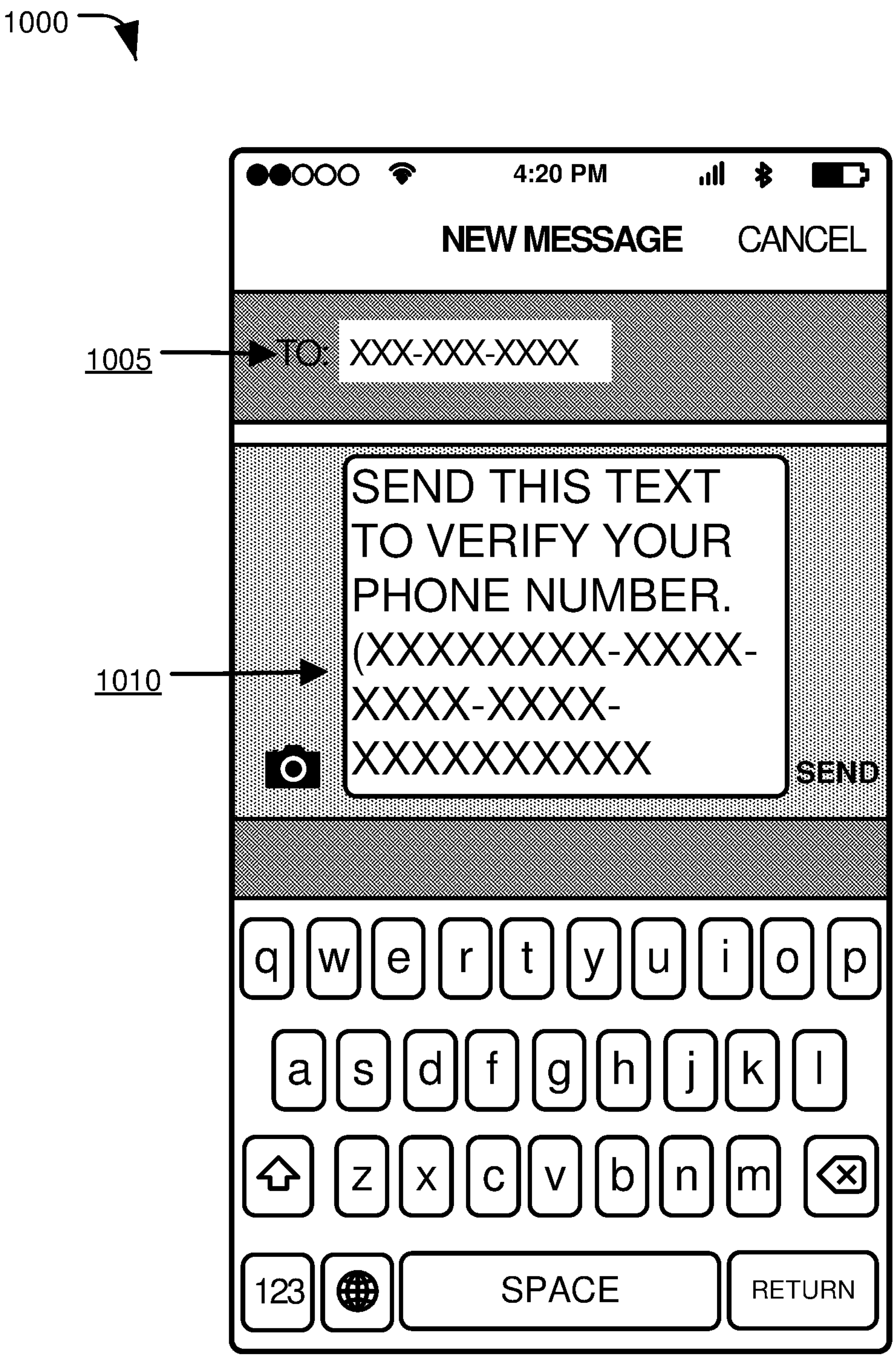
FIG. 10 depicts a GUI showing an SMS interface for authenticating a client device according to one or more aspects of the disclosure.

At block 204, once the purchasing module is accessed, the client computer 120 used to access the purchasing module may be authenticated by the server computer 110. Authentication can occur according to any number of methods. In one example, the client computer can transmit a unique identifier associated with the device 120 to the server 110. For mobile devices, such unique identifier can be a UDID 1010 and can be transmitted via SMS (as shown in GUI 1000 in FIG. 10) to a telephone number 1005 associated with and accessible by server 110. In this regard, the server 110 can store and associate the telephone number of the user and the UDID of the client device. Upon authentication of the user's client device, a web token can be stored on the client device 120 which can be transmitted to the server 110 upon subsequent sessions in the purchasing and/or results module.

Figure 9:
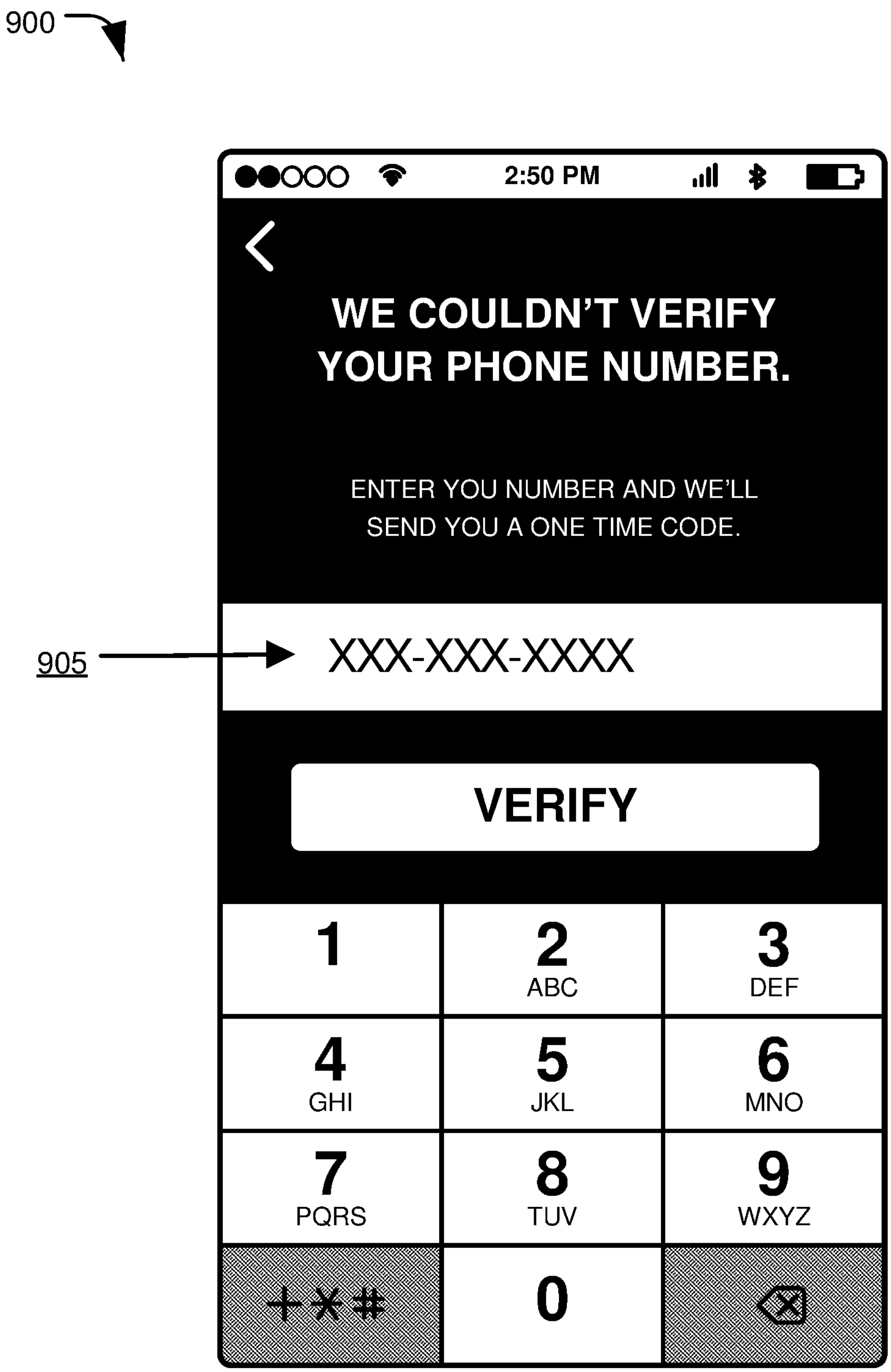
FIG. 9 depicts a GUI showing the purchase module according to one or more aspects of the disclosure.

In another example, the user can enter his or her phone number 905 into the purchasing module (as shown in in the GUI 900 in FIG. 9) and can receive a code via SMS. The user can then enter the code into the purchasing module and the client device can be associated with the telephone number and the UDID associated with the client device. Optionally, a user may enter his or her name. This information may or may not be used to verify a user's identity. In another example, the user may choose to provide login information for a social media account, such as Facebook, and allow the server 110 to gather the user's first and last name.

At block 206, a user may select a lottery from a list of available lottery drawings for which the user would like to purchase a ticket. The list of available lottery drawings displayed to the user can be determined by the location of the user and/or the client device 120. For example, the client computing device 120 can have a GPS sensor that can identify the location of the client device 120. The location information can be transmitted to the server computer 110 to verify the presence of the user in a particular state and to provide available drawings in that particular state. In this regard, a user may not access state lotteries that are not available in the state in which the user and his or her client device are currently located. If a user does not allow the location of the client device 120 to be shared with the server computer 110 (by disabling such features through one or more settings of the client device), the user will not be able to continue to the next steps of selecting and purchasing tickets since their location cannot be verified.

Depending on the state, the available lotteries can include state lotteries, such as a daily state lottery including three, four, or more numbers that can be drawn at least once per day, or a periodically-drawn Powerball® lottery including five numbers and a special sixth Powerball®.

Figure 5:
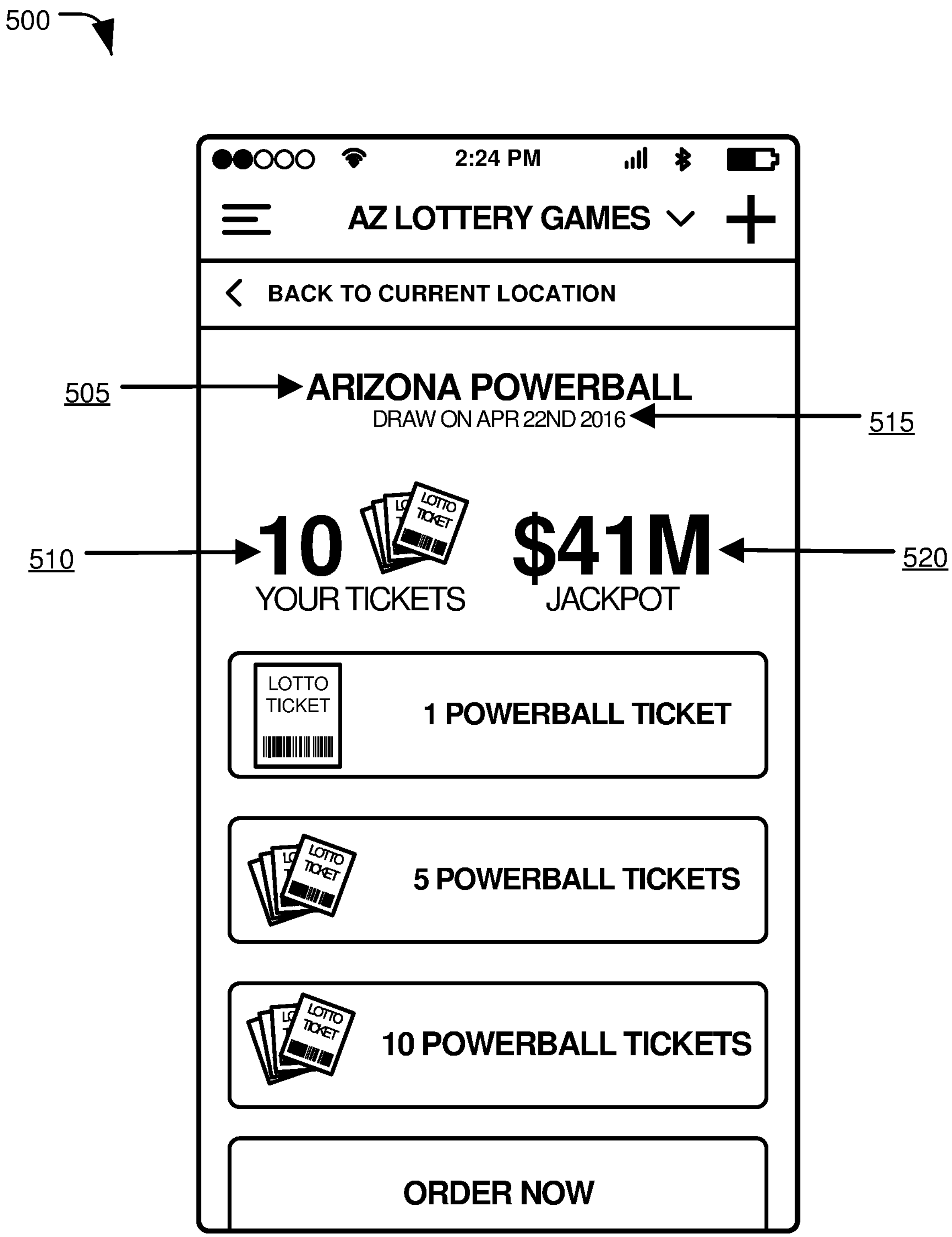
FIG. 5 depicts a GUI showing the purchase module according to one or more aspects of the disclosure.

At block 208, a user may select a number of tickets to purchase from the lottery selected at block 206 and may select the lottery numbers to play for each ticket. As shown in GUI 500 in FIG. 5, the user may select predetermined lottery ticket amounts displayed by the purchasing module, such as one, five, or ten Powerball® tickets. The purchasing module can also display the state 505 in which the lottery is being held, the number of tickets to be purchased 510, the date on which the lottery will be drawn 515, and the jackpot amount for winning the lottery drawing 520.

A user may wish to purchase one or more tickets with predetermined lottery numbers selected by the user or with random numbers. If the user desires to purchase tickets with predetermined lottery numbers, the user can input those lottery numbers into the purchasing module via a touch screen interface (or other input interface) of the client computer 120.

If the user desires to purchase tickets with random lottery numbers, this request is transmitted to the server computer 110 where random lottery numbers are generated according to the rules of the selected lottery. For example, in a lottery where three numbers from 0-9 are drawn, the server 110 can generated three numbers between 0-9. The random numbers can be generated at the server computer 110 according to any number of random number generation techniques, and in one example can be generated according to a cryptographically secure method to prevent fraudulent or unauthorized activity in purchasing the lottery tickets. Once the random lottery numbers are generated at the server computer 110, they can be transmitted to the client device 120 and displayed for inspection by the user. The user may choose to continue with the random lottery numbers or may desire a different set of random lottery numbers, in which another set of random lottery numbers are generated at the server 110 and transmitted to the client computer 120.

In another example, the request for random numbers can be transmitted to the server 110 where an authorized employee may request such random lottery numbers directly from the terminal 130, e.g., via a quick-pick process. In this regard, the random lottery numbers associated with the ticket may or may not be transmitted to the client device 120 for display to the user for approval prior to purchase.

In still another example, random numbers can be generated on the client device 120 and displayed for inspection to the user. The user may choose to continue with the random lottery numbers or may desire a different set of random lottery numbers, in which another set of random lottery numbers are generated at the client device 120.

Figure 6:
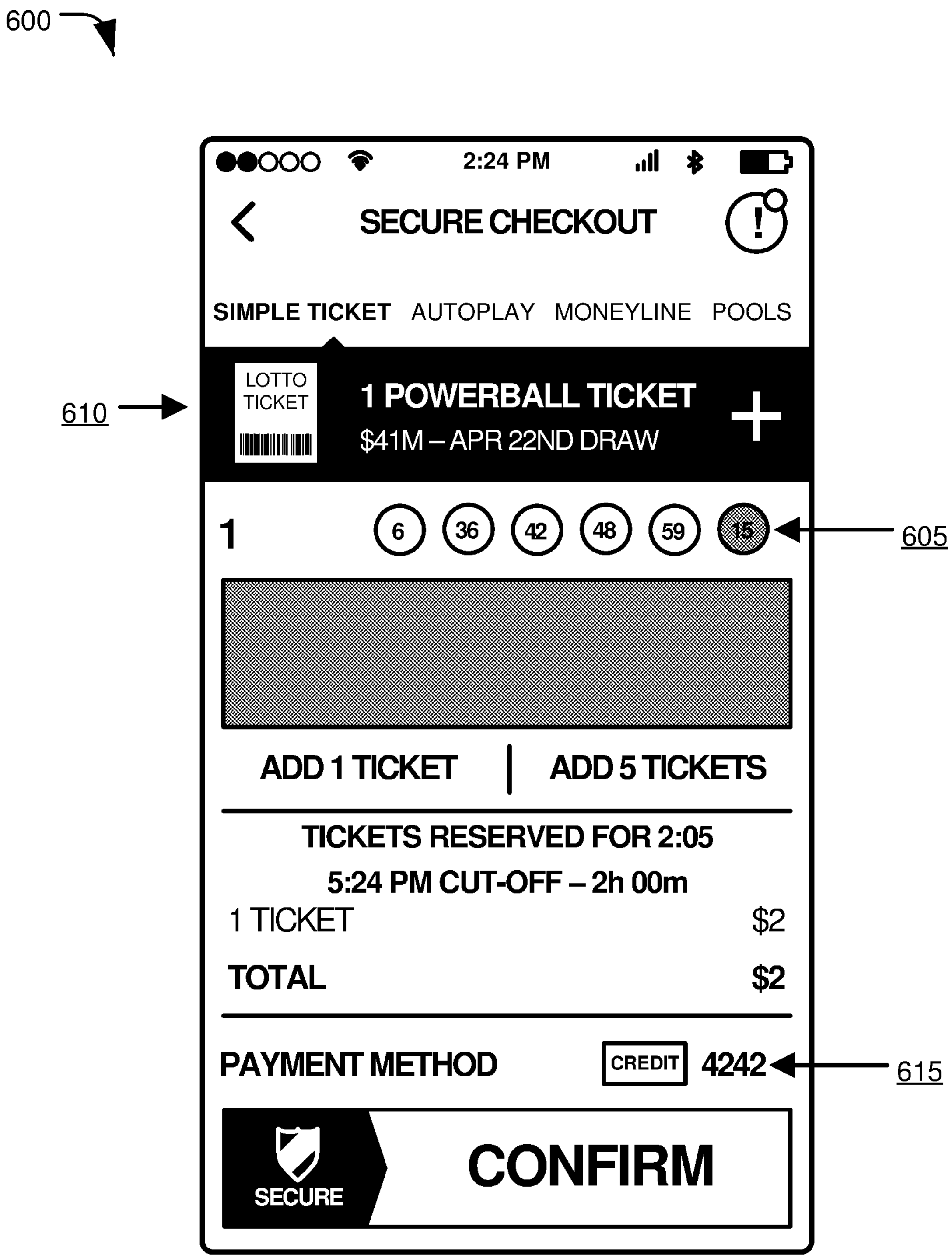
FIG. 6 depicts a GUI showing the purchase module according to one or more aspects of the disclosure.

At block 210, the user may purchase the desired number of tickets with the desired lottery numbers selected at block 208. Depending on the lottery and the number of tickets, a total cost for the amount of tickets is calculated at the server 110 (or client device 120) and transmitted to the client computer 120 for display to the user. The user can pay the cost for the tickets by a credit card by entering their credit card information into the purchasing module and it can be transmitted to the server 110. The credit card information can be stored in the purchasing module, the client device 120, or the server 110 for subsequent transactions. In some examples, which will be described in greater detail below, a user may purchase tickets against an existing balance if he or she has won previous lotteries and retained the balance. Once purchased, the number of tickets and associated numbers can be stored in the purchasing module for later viewing. As shown in the GUI 600 of FIG. 6, the lottery numbers 605 and the number of tickets 610 are displayed by the purchase module prior to purchase. Once confirmed, a user may select the payment method 615 to finalize the purchase.

Figure 7:
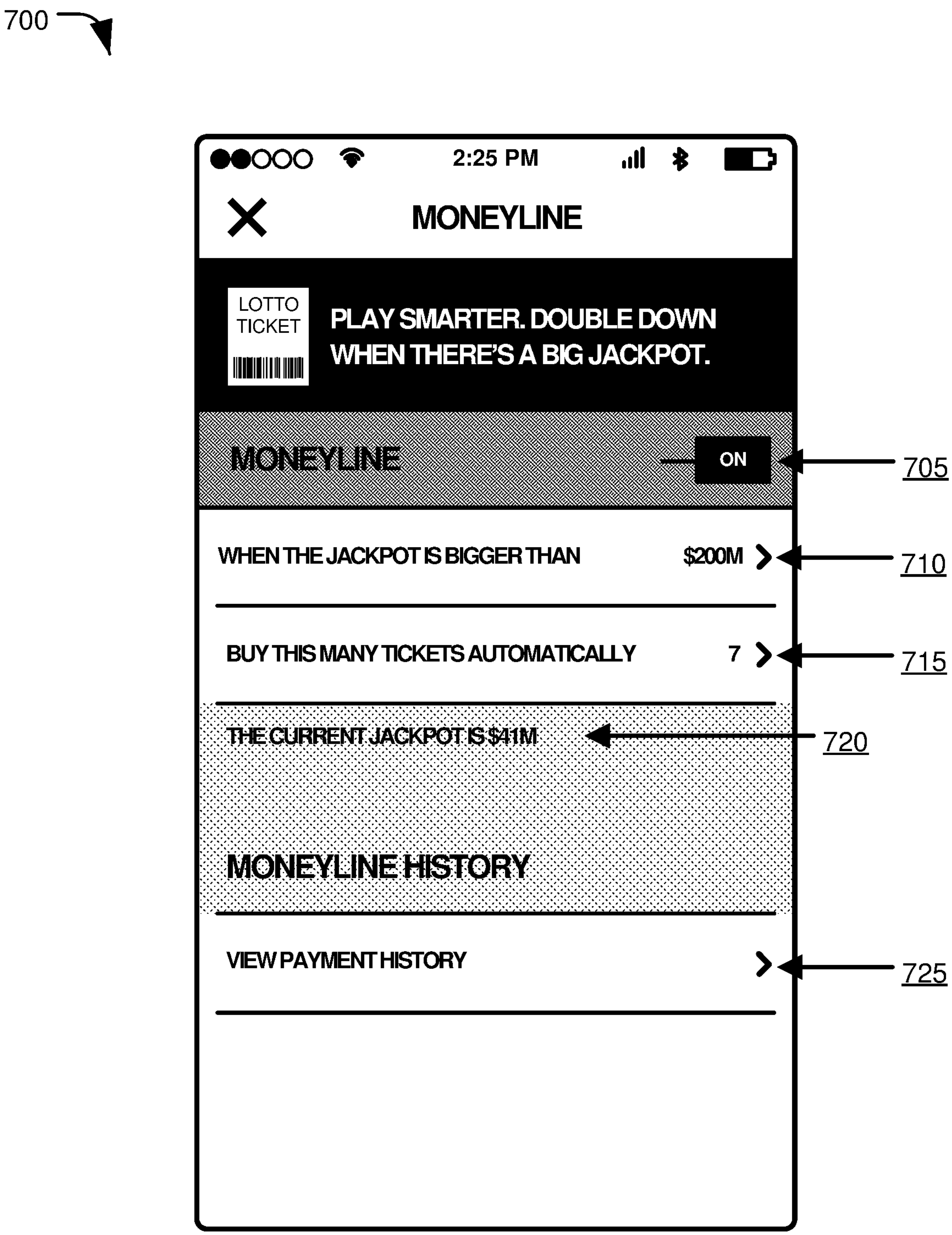
FIG. 7 depicts a GUI showing the purchase module according to one or more aspects of the disclosure.

As shown in the GUI 700 of FIG. 7, a user may purchase tickets automatically when the jackpot amount reaches a predetermined value. In this example, a user may toggle this feature with button 705. Once toggled, a user may select the predetermined value 710 that triggers the automatic purchase. In this example, the value is $200 million. The user may also select the number of tickets 715 to purchase automatically, e.g., seven tickets. The purchase module may also display the current value of the jackpot 720 and allow the user to review previous automatic purchase and payment history 725.

Figure 8:
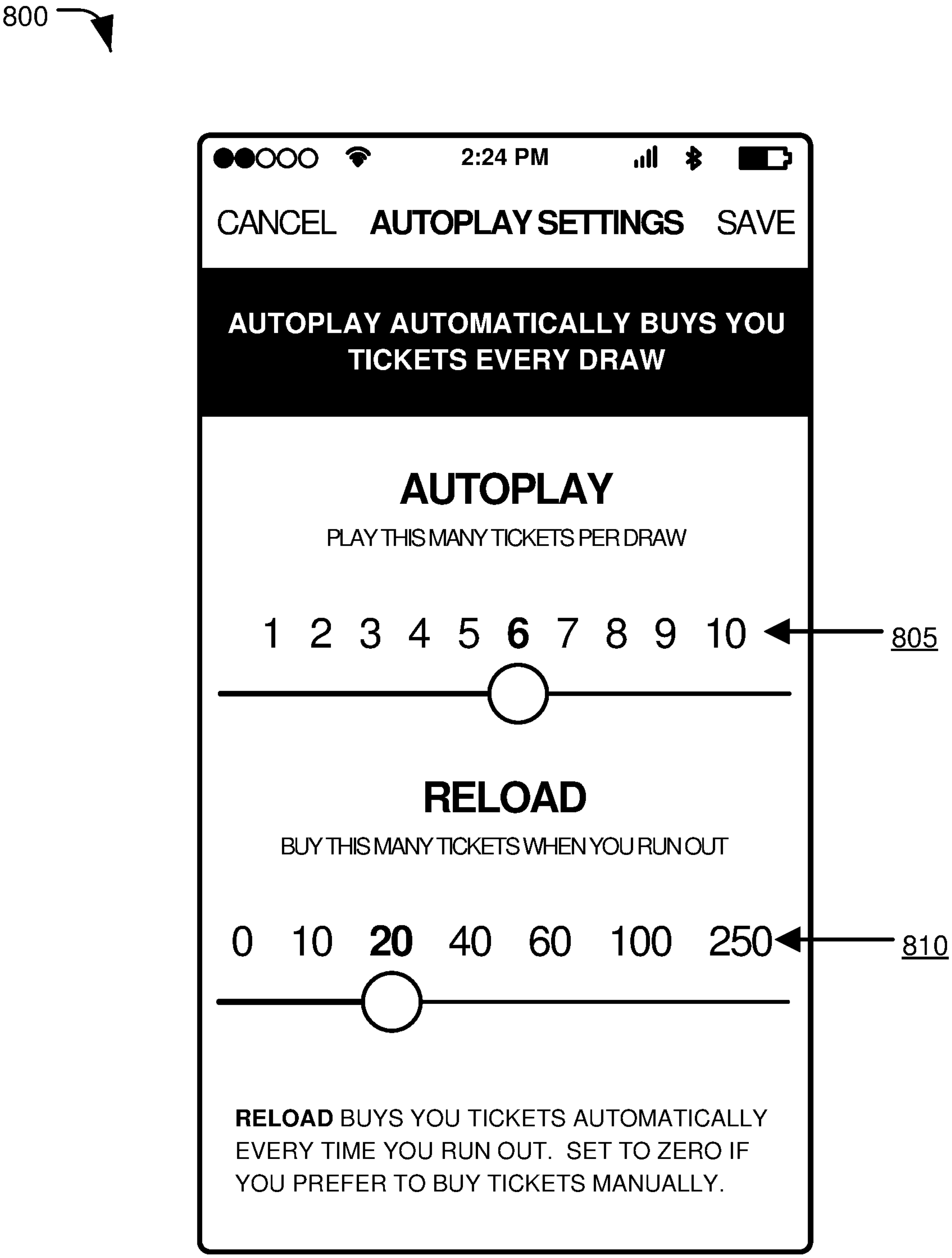
FIG. 8 depicts a GUI showing the purchase module according to one or more aspects of the disclosure.

As shown in the GUI 800 of FIG. 8, a user may automatically purchase and play tickets irrespective of jackpot value. As shown, a user may select a number of tickets 805 to be automatically played for each drawing. At 810, a user may select a number of tickets 810 to automatically reload and purchase if the number tickets available to play runs out. For example, if a user desires to play 10 tickets per drawing, a user may wish to purchase 100 tickets at once and play 10 with each drawing. At the end of 10 drawings, 100 additional tickets may be reloaded.

Figure 3:
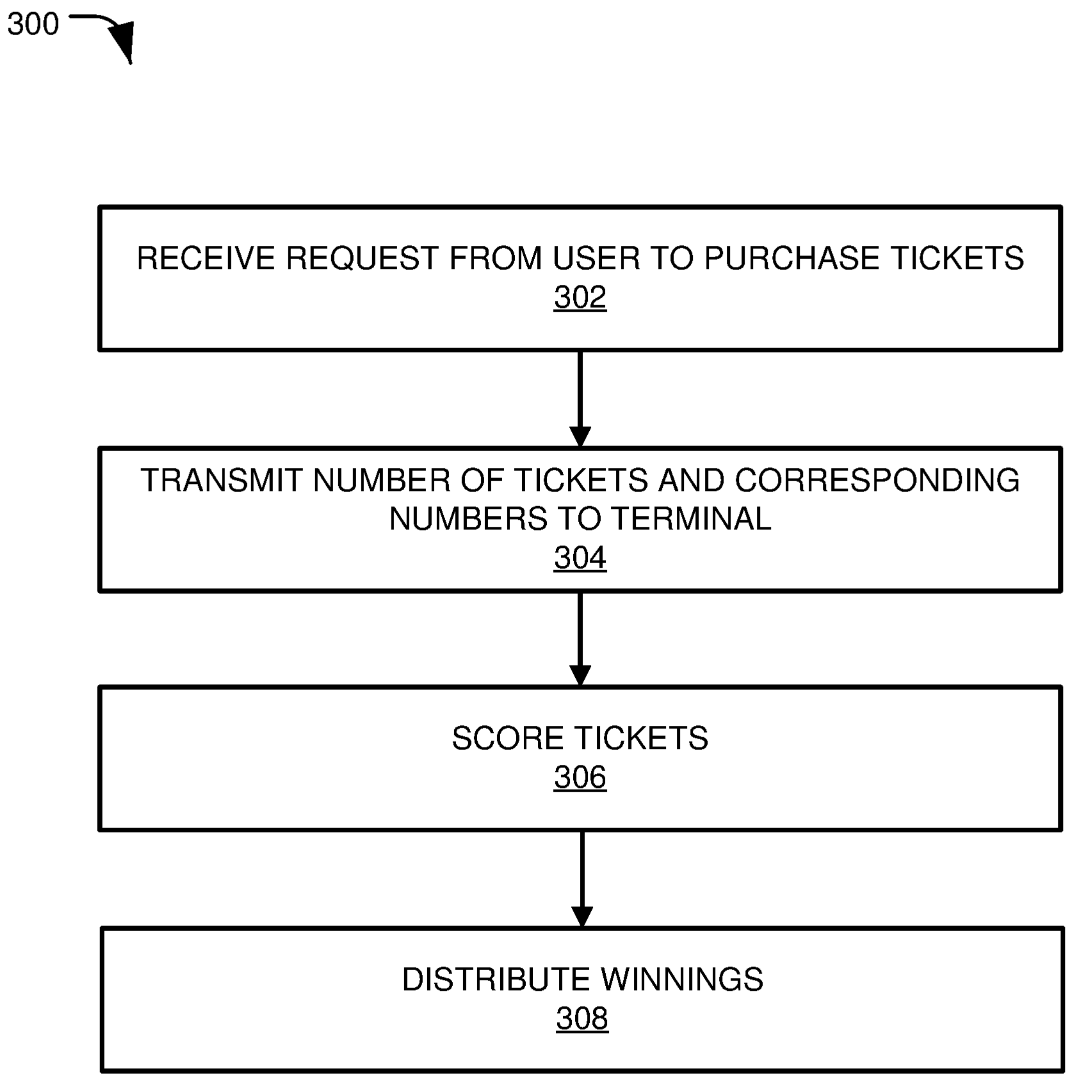
FIG. 3 depicts a method of purchasing and redeeming tickets according to one or more aspects of the disclosure.

FIG. 3 depicts a method 300 of purchasing and redeeming tickets according to one or more aspects of the disclosure.

At block 302, the server computer 110 may receive a request from the client computer 120 to purchase a predetermined number of tickets with corresponding lottery numbers selected above. The request can be stored at the memory 114 and can be associated with the unique identifier (UDID) and the telephone number associated with the client device.

At block 304, the number of tickets and selected numbers for each are transmitted to the terminal 130 to purchase the tickets. In some examples, this can include an authorized employee manually entering a betting slip into the terminal, at which point a physical printed lottery ticket is dispensed from a printer onboard the terminal or directly or indirectly connected to the terminal. Upon entering such information, physical printed tickets (e.g., 1 40) may be provided from the terminal (e.g., 130). In other examples, the numbers and tickets can be transmitted automatically via link 128 to the terminal 130 for automated purchase and printing.

At block 306, after the lottery drawing has occurred, each of the tickets stored in the memory 112 is scored according to the rules for the particular lottery. For example, in a drawing including five numbers, matching three numbers may yield a certain amount of winnings while matching four numbers may yield a greater amount of winnings. In other examples, optical character recognition (OCR) may be used to detect the numbers associated with the physical printed tickets. The OCR data can be stored in the memory 112 at the server 110.

At block 308, winnings may be distributed for those tickets entitled to such. A notification may be first sent, as described with respect to FIG. 4 below. The amount of winnings can be stored in the memory 112 and can be associated with the unique identifier and the telephone number corresponding to the client device 120. In one example, redemption of the lottery ticket may occur by an authorized employee at the terminal by scanning the ticket at the terminal. In another example, the printed tickets can each be scanned (e.g., by a camera, barcode scanner, etc.) and the winnings associated therewith can be automatically determined by the server 110 or the terminal 130. In still another example, the OCR data generated above can be used to determine the winnings.

Figure 4:
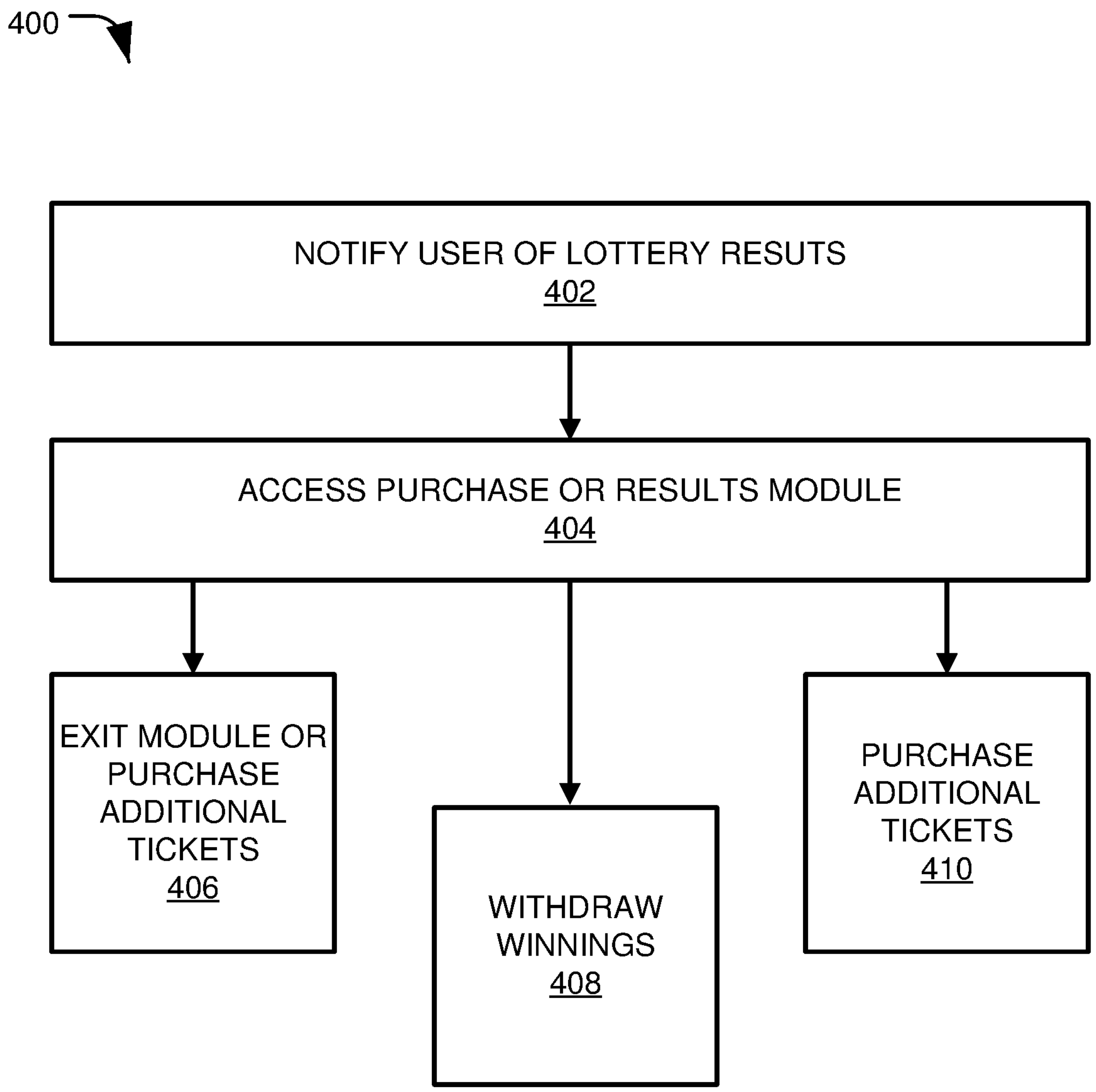
FIG. 4 depicts a flow chart of a method of notifying a user of lottery results and redeeming according to one or more aspects of the disclosure.

FIG. 4 depicts a flow chart of a method 400 of notifying a user of lottery results and redeeming according to one or more aspects of the disclosure.

At block 402, a user may receive a notification at the client device of the results of the lottery drawing. The notification can be an SMS message to the phone number associated with the client device or can be a notification generated by the purchase module or results module installed on the client device. Like the purchasing module, the results module can be a software application downloaded to the client device, stored in the client device memory, and executed by the client device processor, or can be an Internet website accessible via the Internet. The results module can be displayed on the screen of the client computer via a graphic user interface (GUI). In some examples, the purchasing and results module can be a single module, while in other examples the two modules can be separately accessible applications stored on the same or different client devices.

At block 404, the user may access the purchasing module or the results module in response to the notification. In some examples, the user may disable notifications on his or her phone (e.g., silent mode). In this regard, the user may access the purchasing or results module to view the lottery results without having first received a notification, but at some time after the lottery drawing has occurred. Based on the results of the lottery drawing, the user may make one or more choices.

At block 406, a user may be previously notified that their lottery ticket did not yield any winnings. In this regard, the user can exit the purchasing or results modules or can proceed to the purchasing module to purchase tickets for future drawings (returning to block 202 above).

At block 408, a user may be previously notified that their lottery ticket yielded winnings. In this regard, the user may wish to withdraw the winnings directly to a bank account. To do so, the user can enter their bank account (e.g., routing and/or account number) information into the client device via user input. This information can be transmitted to the server 110 where a money transfer can be initiated to the user's bank account via ACH or other electronic money transfer techniques.

At block 410, a user may be previously notified that their lottery ticket yielded winnings. In this regard, the user may wish to use the winnings to purchase additional tickets for future drawings. In this example, the balance of the winnings can be associated with the UDID and the telephone number and stored at the memory 114. In subsequent sessions with the purchasing module, the balance may be displayed to the user via the purchasing module and can be used to purchase lottery tickets for future lottery drawings. In some examples, a user may withdraw a portion of the winnings at block 408 and retain another portion of the winnings as a balance to purchase tickets for future drawings at block 410.

Figure 11:
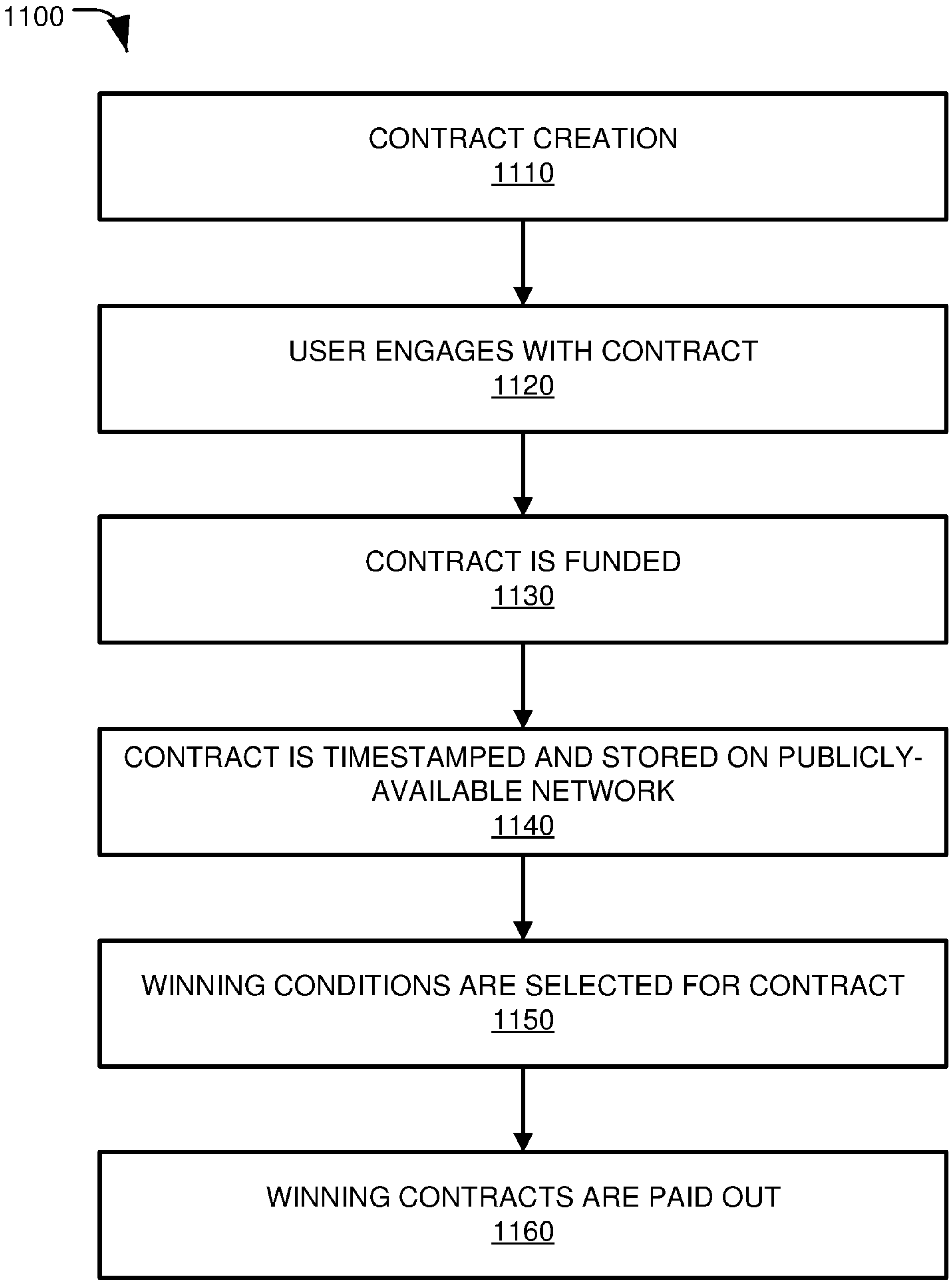
FIG. 11 depicts an overall method of a trustless and/or semi-trustless wagering method according to one or more aspects of the disclosure.
Figure 12:
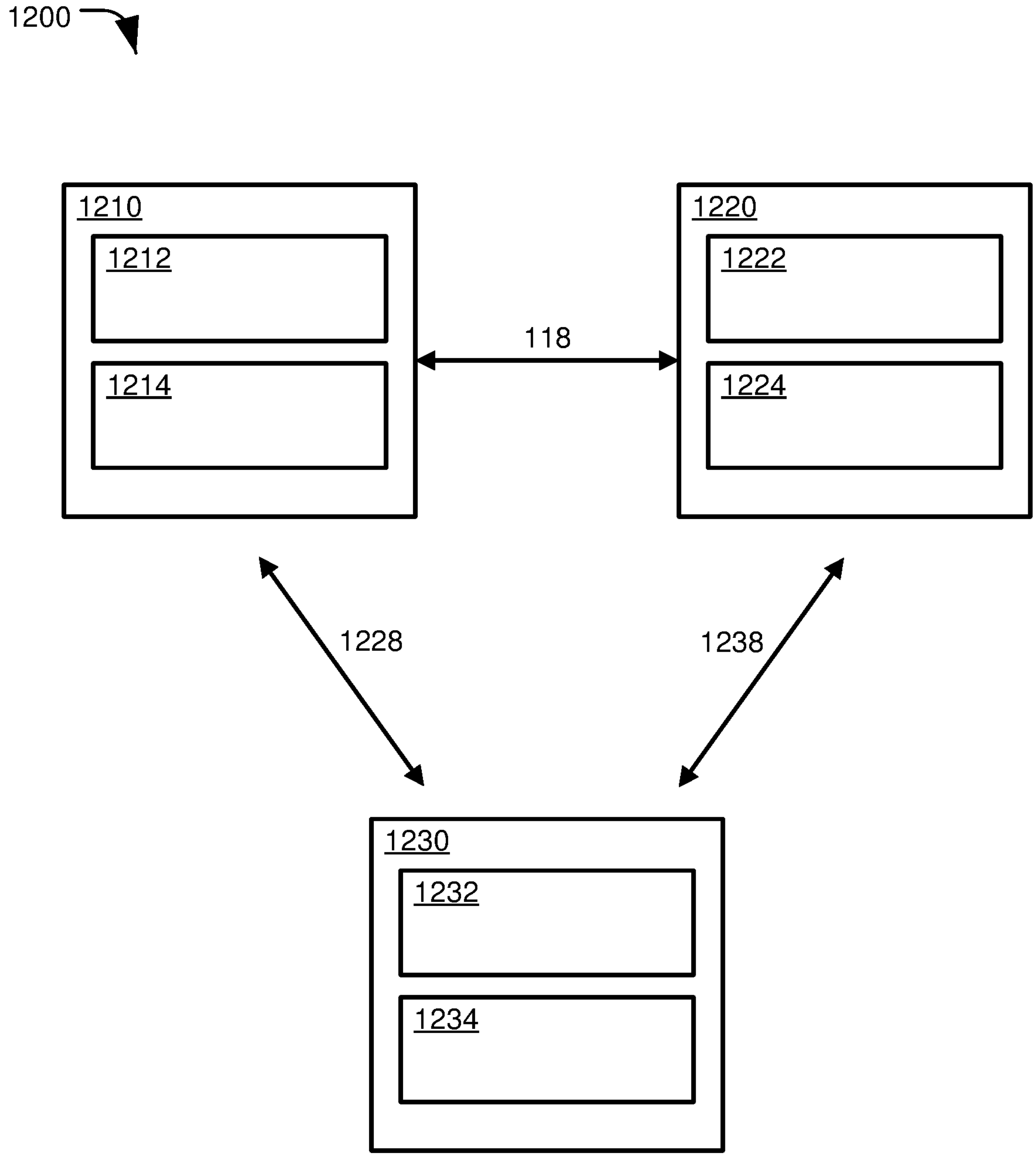
FIG. 12 depicts a system for implementing a method of a trustless and/or semi-trustless wagering method according to one or more aspects of the disclosure.

FIG. 11 depicts an overall method 1100 of a trustless and/or semi-trustless wagering method according to one or more aspects of the disclosure. FIG. 12 depicts a system for implementing a method of a trustless and/or semi-trustless wagering method according to one or more aspects of the disclosure.

Turning first to FIG. 12, the system 1200 can include computers 1210, 1220, and 1230 which can each be general purpose computers similar to the computers 110 and 120 described above, having processor(s) 1212, 1222, 1232 and memory 1214, 1224, and 1234 and other components generally present in general purpose computers, such as display, input, keyboard, etc. The computers 1210-1230 can be connected directly or directly connected, wired or wirelessly, via links 1218, 1228, and 1238. Computer 1210 can be an administrator computer or server operated by a lottery, raffle, or wagering event administrator, computer 1220 can be a client device operated by a user, while computer 1230 can be a publicly accessible computer or network of computers operated by a third party, such as the Ethereum® network, which can be a decentralized platform using a custom blockchain to operate and execute contracts without any possibility of downtime, censorship, fraud, or third party interference.

Turning to FIG. 11, at block 1110, a contract is created. The contract can be any type of contract, such as a lottery, a raffle, or any type of wagering contract. In one example, the contract can be a lottery whereby a user can provide a predetermined amount of currency, such as cryptocurrency, for a chance at winning a prize, such as a product, a gift, or a monetary award (such as cryptocurrency). Such cryptocurrencies, can include, for example, Bitcoin (BTC), LiteCoin, PeerCoin, PrimeCoin, Namecoin, Ripple, Quark, Freicoin, Mastercoin, Nxt, Auroracoin, DogeCoin, Ethereum, or any other type of cryptocurrency that uses a transactional blockchain that is publicly available.

Typically, in a lottery, a user can purchase a ticket, such as by purchasing a ticket according to any of the methods of ticket purchase described above. The ticket can have a set of numbers associated with it such that, when the lottery is drawn, the user's payout depends on whether the numbers of their ticket matches the winning numbers. In addition to lottery drawings, the contract can have other winning conditions, such as matching of predetermined numbers. The contract can be stored at the computer(s) 1230, where it can be publicly-accessible and outside the control of either the client computer 1220 or the administrator 1210. The contract can have a predetermined drawing date where the winning conditions of the contract are determined. For example, for a lottery, the contract may indicate that the winning numbers (e.g., winning condition) of the lottery will be chosen at 9 PM EST.

At block 1120, a user will engage with the contract. In this example, the user can buy a ticket to a lottery, raffle, or other wagering event. The user can engage with the contract in-person, through a mobile application, through a telephone call, through an application for a desktop computer, or by any other network-based connection. The user may engage with the contract via client computer 1220 and a direct or indirect connection with computer(s) 1230.

At block 1130, the contract will be funded. For example, the contract can be funded with a cryptocurrency. The user can provide the amount of cryptocurrency to be stored and held at a server until the lottery, raffle, or other wagering event is drawn or determined. The cryptocurrency can be stored at administrator computer 1210. In other examples, the currency can be currency such as dollars, etc., and can be stored at a bank account accessible to administrator 1210.

At block 1140, each funded contract is timestamped and coded and stored at the computer 1230.

At block 1150, the winning conditions are selected for the contract. In one example, the computer(s) 1230 can implement one or more oracles. As used herein, an oracle may refer to an executable set of instructions that interface with the computer(s) 1230 and any other computer via a network to extract data and provide that data to a contract stored on the computer(s) 1230.

At the predetermined time associated with the contract, such as the drawing time, one or more oracles can extract data from transaction hashes from one or more cryptocurrencies. Transaction hashes can be an alphanumeric string of characters of a predetermined length. For example, a publicly available transaction hash from Ethereum can be "0x984eca9e6fdb3bb3cde5d5f24be9e51 3e1 4f96744f9e1c6ef3c63 1 a6e363ba32."

The data extracted from the cryptocurrencies can include an entire transaction hash, a portion of a transaction hash, such as a single number at a beginning, an end, or any number from the entire hash.

In one example, at least a subset of the plurality of oracles extracts at least a portion of the transaction hash that occurs immediately after the drawing time associated with the contract from a plurality of cryptocurrencies. In particular, each of the subset of oracles can extract the first two numbers from a Bitcoin transaction hash, the first two numbers of a Ethereum transaction hash, and a LiteCoin transaction hash. This can result in six single-digit numbers that can serve as the basis for the winning condition of the contract. In the example of a six digit lottery, the six digits can serve as the six winning numbers of the lottery. The subset of oracles can compare data to ensure that the same transaction hashes are used and result in the same winning numbers or winning condition.

Once the data is extracted, it is provided to the contracts associated with the drawing, where each contract is then valued according to a comparison with the determined winning condition.

At block 1160, winning contracts are paid out. Each contract is compared to the determined winning condition. The comparison can include comparing the selected numbers of a user's ticket to the winning numbers or winning condition in a lottery or a raffle. Other comparisons can include any type of winning condition for any type of wagering event. For each winning contract, cryptocurrency is paid to the user associated with the contract.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for processing a transaction request purchasing lottery tickets, the system comprising:

a computer associated with a distributed ledger including a processor in wireless communication with a client device, said client device including a touch screen interface configured display graphical user interfaces thereon and a GPS sensor configured to determine a location of the client device;

a memory in communication with the processor, the memory including non-transitory computer readable medium storing program instructions which, when executed by the processor, direct the system to:

receive from the client device, a transaction request for a lottery, raffle or wagering event, data representative of a unique identifier of the client device, and data representative of a location of the client device obtained from the GPS sensor;

transmit from the computer to the client device a list of one or more available lotteries, raffles or wagering events according to the location of the client device;

cause a graphical user interface (GUI) to be provided to a user of the client device on a display of the touch screen interface of the client device, wherein the GUI provides a list of transactions available for selection by the user;

receive, via the GUI, a user request from the client device via the touch screen interface to engage in at least one of a lottery, raffle or wagering event selected from the list, wherein the user request is associated with the unique identifier and includes a user-selected amount of a currency from the client device, wherein data associated with the entry includes at least one winning condition and is stored in a contract created by a decentralized platform with input by at least one of the computer or client device using a custom blockchain and funded by cryptocurrency representing the currency on the decentralized platform using the custom blockchain configured to support wagering contracts, and wherein the decentralized platform is communicably coupled to at least one of the computer and the client deice, and is outside the control of the computer and the client device;

timestamp and code the contract;

compare the contract to the at least one winning condition;

transmit, by the computer, a result of the entry to the client device; and cause, by the computer, any winning to be paid out according to the at least one winning condition to a user of the client device associated with a winning entry.

2. The system of claim 1, wherein the request is for a purchase one or more lottery tickets for at least one lottery drawing selected from the list, wherein the user request is associated with the unique identifier and includes a user-selected amount of a currency from the client device, wherein program instructions executed by the processor further direct the system to:

responsive to authenticating the user request, cause a web token to be stored on the client device for transmission to the system in a subsequent session;

responsive to receiving the user request, generate lottery numbers for the one or more lottery tickets in accordance with rules of the at least one lottery;

cause the lottery numbers, and a cost associated therewith, to be provided, via the GUI, to the user on the display; and responsive to receiving payment for the cost, associate the lottery numbers with the unique identifier in the memory.

3. The system of claim 2, further comprising a printer in communication with the processor, wherein when executed by the processor, the program instructions further direct the system to:

cause the one or more lottery tickets including the lottery numbers to be printed, via the printer, on paper.

4. The system of claim 3, wherein when executed by the processor, the program instructions further direct the system to:

cause machine readable code to be printed, via the printer, on the one or more lottery tickets.

5. The system of claim 3 further comprising a scanning interface in communication with the processor, wherein when executed by the processor, the program instructions further direct the system to:

read the printed one or more lottery tickets; and detect by optical character recognition (OCR) the lottery numbers or machine readable code representative thereof.

6. The system of claim 2, wherein when executed by the processor, the program instructions further direct the system to:

responsive to receiving the user request, authenticate user access to the at least one lottery drawings based on the unique identifier.

7. The system of claim 2, wherein when executed by the processor, the program instructions further direct the system to:

cause a notification of results corresponding to the one or more lottery tickets to be provided, via the GUI, to the user on the display.

8. The system of claim 1, wherein the processor is in communication with the client device via the Internet, and wherein the GUI is provided to the user on the display using a web browser.

9. The system of claim 1, wherein when executed by the processor to receive the data representative of the unique identifier, the program instructions further direct the system to:

receive the data representative of the unique identifier transmitted from the client device via SMS to a telephone number associated with, and accessible by, the processor.

10. A method executed by a computer associated with a distributed ledger for operating a system for engaging in transactions including purchasing lottery tickets, purchasing raffle tickets or wagering on an event, the method comprising:

providing the computer with a processor in wireless communication with a client device, said client device including a touch screen interface configured display graphical user interfaces thereon and a GPS sensor configured to determine a location of the client device;

providing a memory in communication with the processor, the memory including non-transitory computer readable medium storing program instructions which, when executed by the processor, directs the system to:

receive data representative of a unique identifier of a client device;

causing a graphical user interface (GUI) comprising a touch screen interface to be provided to a user of the client device on a display of the client device, wherein the GUI provides a list of transactions including purchasing lottery tickets, purchasing raffle tickets or wagering on an event available for selection by the user based on the location of the client device as determined by the GPS sensor;

receive, via the touch screen interface of the GUI, a user request from the client device to engage in a transaction selected from the list, wherein the user request is associated with the unique identifier, wherein the user request is further associated with the unique identifier and includes a user-selected amount of a currency from the client device, wherein data associated with the entry includes at least one winning condition and is stored in a contract created by a decentralized platform with input by at least one of the computer or client device using a custom blockchain and funded by cryptocurrency representing the currency on the decentralized platform using the custom blockchain configured to support wagering contracts, and wherein the decentralized platform is communicably coupled to at least one of the computer and the client deice, and is outside the control of the computer and the client device;

timestamp and code the contract;

compare the contract to the at least one winning condition;

transmit, by the computer, a result of the entry to the client device; and cause, by the computer, any winning to be paid out according to the at least one winning condition to a user of the client device associated with a winning entry.

11. The method of claim 10, wherein the at least one transaction is a purchase of one or more lottery tickets for a lottery drawing, wherein lottery numbers from the one or more locket tickets are generated in response to the user request for the at least one transaction, and wherein when executed by the processor to generate the lottery numbers for the one or more lottery tickets, the program instructions further direct the system to:

generate random numbers according to a cryptographically secure method to facilitate preventing fraudulent or unauthorized activity in purchasing the one or more lottery tickets.

12. The method of claim 11, wherein when executed by the processor, the program instructions further direct the system to:

cause winnings associated with the one or more lottery tickets to be paid to the user.

13. The method of claim 10, wherein when executed by the processor, the program instructions further direct the system to:

cause a notification of results corresponding to the at least one of the available transactions to be provided, via the GUI, to the user on the touch screen interface.

* * * * *